United States Patent
Kramer 4,067,639
Jan. 10, 1978

[54] HOLOGRAPHIC SCANNING SPINNER

[75] Inventor: Charles J. Kramer, Pittsford, N.Y.

[73] Assignee: Xerox Corporation, Stamford, Conn.

[21] Appl. No.: 690,479

[22] Filed: May 27, 1976

[51] Int. Cl.² .................. G02B 27/17; G02B 27/00
[52] U.S. Cl. .................................. 350/6; 350/3.5
[58] Field of Search .............. 350/3.5, 6, 7; 250/236; 179/100.3 G, 100.3 V

[56] References Cited
U.S. PATENT DOCUMENTS

| 3,842,197 | 10/1974 | Broussaud et al. | 350/3.5 X |
| 3,943,275 | 3/1976 | Jebens et al. | 179/100.3 V X |
| 3,947,888 | 3/1976 | Jarsen | 179/100.3 V X |
| 3,950,621 | 4/1976 | Bouwhuis | 179/100.3 G |
| 3,953,105 | 4/1976 | Ih | 350/3.5 X |

*Primary Examiner*—John K. Corbin
*Assistant Examiner*—John D. Lee
*Attorney, Agent, or Firm*—Robert J. Bird

[57] ABSTRACT

A holographic spinner reconstructs a light spot to rapidly scan a narrow line on a suitable "write" surface to generate an image. The spinner is flexibly mounted to assume a high degree of uniformity in its perpendicularity relative to the axis of spin to minimize spot wobble. Alternatively, the spinner is itself a flexible material or floppy disk.

Method of mounting the disk on a shaft using a setting compound during spinner rotation is also disclosed.

2 Claims, 6 Drawing Figures

HOLOGRAPHIC SCANNING SPINNER

BACKGROUND OF THE INVENTION

This invention relates to light spot scanning, and more particularly to scanning with a spot of light generated holographically.

The primary function of a scanning system is the controlled sampling, or restoration, of information. In an optical scanning system, the information is processed either in parallel by a light beam which can simultaneously illuminate many data sites, or sequentially by a beam which, due to its size, illuminates only a single data site at a time. Interest in sequential optical scanning has expanded in recent years, primarily because of new capabilities provided by laser light. Laser scanners are capable of generating high resolution images at high scan rates. Most of the scanning systems devised to manipulate a laser beam include a galvanometer, rotating mirror, acousto-optic element, or electro-optic element as the light deflector. It was first demonstrated in 1967 that a rotating hologram can also serve as a deflector element in an image scanning system.

Laser line scanners used for imaging applications are generally required to generate a repetitive single scan line. A problem which has been encountered with multi-faceted rotating mirror line scanners is that due to the facet-to-facet nonuniformities and spinner wobble, non-collinear multiple scan lines are formed. An obvious solution to this problem is to fabricate the spinner assembly to such precise mechanical and optical tolerances that the residual error does not detract from the desired level of image quality. The expense of this approach, however, is a decided disadvantage. Holographic scanning provides an alternative by which this problem can be minimized.

In a typical arrangement for making a flat holographic spinner, a point light source serves as the object and a normally incident plane light wave as the reference beam. When a hologram thus constructed is illuminated with a plane light wave which is the inverse of the original reference beam, the hologram functions to reconstruct the original propagating wavefront which converges to form an image of the original point light source. When the holographic spinner is then rotated about the axis of the reference beam, the reconstructed image spot scans a circle in space.

It is an object of this invention to provide a holographic spinner which is essentially free from mechanical wobble during rotation.

Another object is to provide a method of fabricating a holographic spinner essentially free from mechanical wobble.

Other objects advantages and features of this invention may become apparent from the following more detailed description given in connection with the accompanying drawing.

DRAWING

DESCRIPTION

Figure 1:
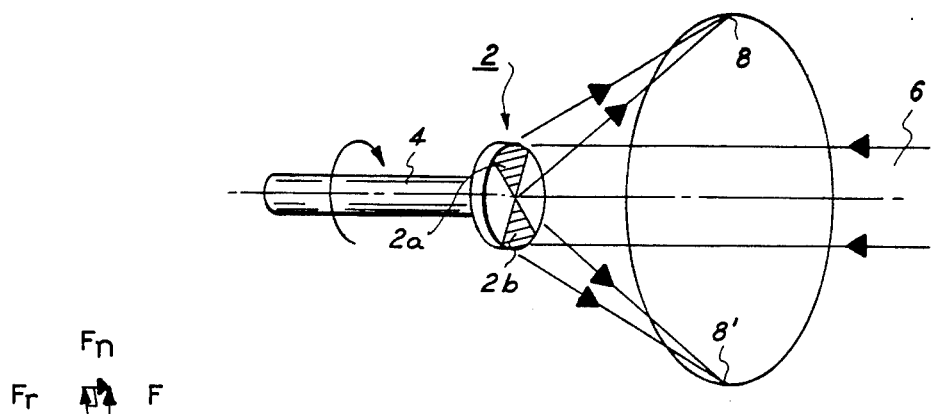
FIG. 1 is a schematic illustration of a typical geometry for a holographic scanner.

Referring now to FIG. 1, a holographic spinner is shown at 2 mounted for rotation on shaft 4. Holographic spinner 2 as shown here is a reflection hologram and is disposed in the path of a reconstruction light beam 6 which reflects from the face of the hologram as a reconstruction of the original interfering wavefront to which the hologram was originally exposed. Thus, at any instant, an image of the original point source is reconstructed, and the locus of this reconstructed point source as the hologram is spun on the axis 4 is a circle in space. As shown in FIG. 1, the spinner 2 can be sectioned into a plurality of "holographic facets" which are analogous to the several facets of a polygon mirror scanner. Two such sections or "facets" are shown in FIG. 1, but this is only illustrative. There can be any number of such sections, subject to other limitations such as the light level required at the reconstructed point sources. Since these several facets are generated photographically on a single flat surface their imaging characteristics can be controlled to a high degree of precision with the result that facet-to-facet differences can be virtually illuminated. With facet-to-facet uniformity achieved, the only remaining element in the system which contributes to the multiple line image problem is mechanical wobble of the spinner element. The following relates to techniques for eliminating wobble in rotating spinners.

Figure 2:
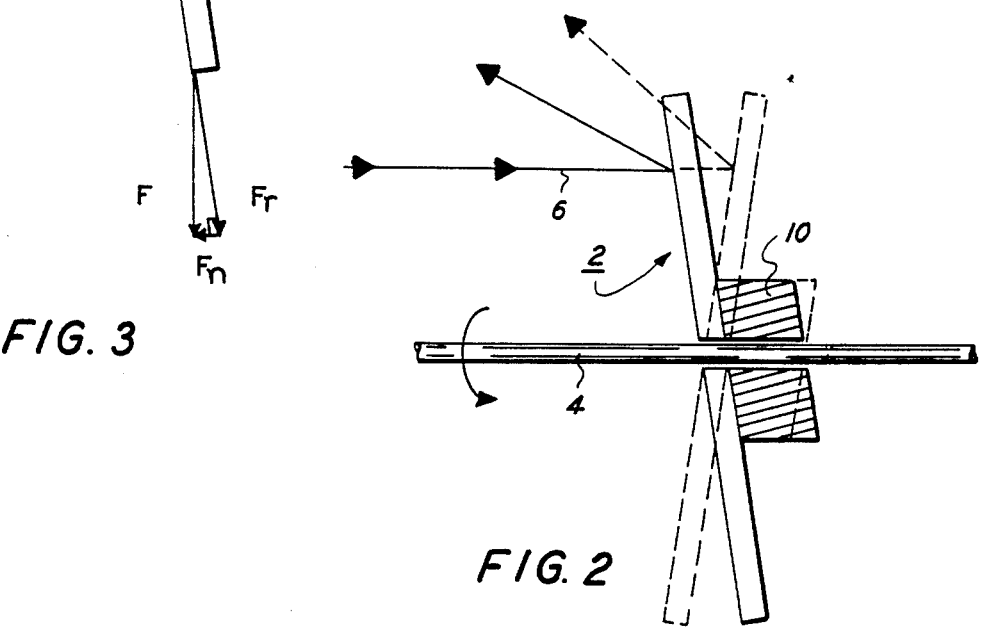
FIG. 2 is an exaggerated schematic of a holographic spinner according to the prior art.

FIG. 2 shows an exaggerated view of what occurs when a holographic spinner element is rigidly mounted so that the plane containing the holographic facets periodically wobbles. The two views in FIG. 2 illustrate how light is reflected from the hologram at two different positions of the spinner 2, 180° from each other in rotation. A prior art spinning element rigidly mounted in this fashion will maintain the same amplitude of wobble at all rotation rates until a sufficiently high rotation rate is reached where the spinner shatters or breaks loose from its mounting as a result of centrifugal force. Obviously, the reconstructed point source from such a hologram will define a wobbly circular locus in space, and a multifaceted hologram will define a plurality of wobbly circular loci in space.

Figure 3:
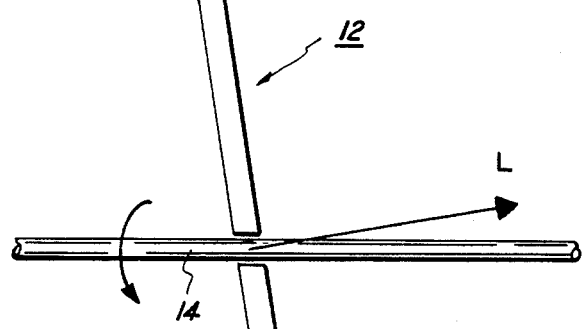
FIG. 3 is a diagramatic of the forces acting upon a spinning wheel such as the spinner of FIG. 2.

The forces acting on a rotating wheel are analyzed in FIG. 3 in which a rigid wheel 12 is shown rotating on an axis 14 with respect to which wheel 12 is somewhat tilted. As a consequence of the wheel 12 being tilted, its angular momentum vector, L, does not lie along the rotor axis 14 but precesses about it. The vector F in this Figure represents the total centrifugal force acting on a unit element of the wheel. Because of the wheel tilt, the vector F has a radial and a normal component, $F_r$ amd $F_n$ respectively, with respect to wheel 12. The magnitude of the centrifugal force vectors are given by way of the following equations:

$$F = m w^2 r$$

$$F_r = F \cos \theta$$

$$F_n = F \sin \theta$$

Where $m$ is the mass of a unit element, $r$ is its radial distance from the center of rotation, $w$ is the angular velocity of the wheel and $\theta$ is the angle between the normal to the wheel surface and the rotor axis.

As a result of the wheel symmetry, the $F_t$ forces are in a state of equilibrium, as long as they do not exceed the strength of the material, while the $F_n$ forces coherently add to generate a torque which is normal to the sides of the wheel. If the wheel is rigidly mounted to the rotor this torque tries to bend the wheel since its magnitude increases with radial distance. If, on the other hand, the wheel is flexibly coupled to the rotor the torque will act to make the sides of the wheel perpendicular to the rotor axis. When this occurs, the $F_n$ vector reduces toward zero and the direction of the angular momentum vector L approaches the rotor axis.

Figure 4:
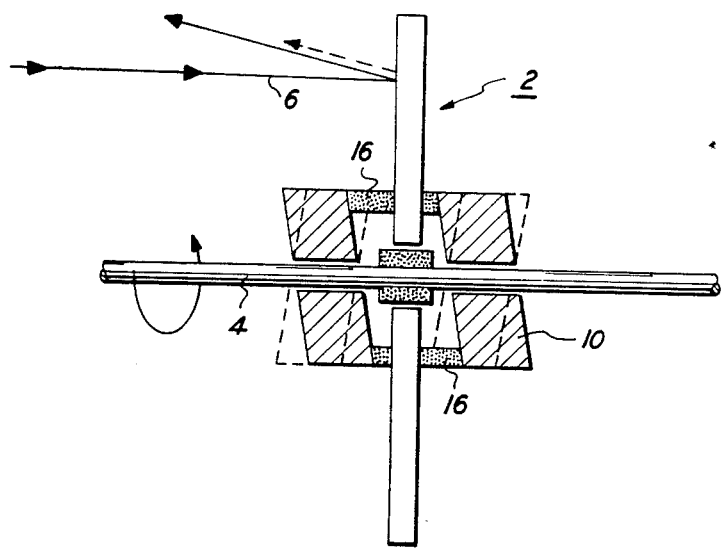
FIG. 4 is a schematic of a flexible spinner mounting arrangement according to this invention.

In the present technique, the wobble in the holographic spinner 2 is significantly reduced by flexibly mounting the spinner on the rotor 4 as illustrated in FIG. 4. This figure was drawn so that the rigid metal guides 10 of the mounting assembly are depicted as having the same amount of wobble as the mounting guide 10 of FIG. 2. An elastomer member 16 is included between guide 10 and spinner 2 and elastically deforms under the influence of the $F_n$ component of the centrifugal force and permits the spinner 2 to find its own inertial reference frame.

It is important to note that the degree of wobble correction is proportional to the angular momentum of the spinner and inversely proportional to the stiffness of the elastomer. Since $F_n$ decreases as the wobble angle decreases the final degree of correction will strongly depend on the spinners angular momentum, the mounting arrangement and the elastomer used.

The first implementation of this mounting technique utilized rubber as the elastic material. Holographic spinners, run at 3000 RPM with this first flexible mounting arrangement, experienced a reduction in wobble by a factor of five when compared with the same spinner rigidly mounted. A higher running speed or a more flexible material in the mount would further reduce the wobble.

It is apparent that with just a rubber-like material in the mount the spinner will asymptotically approach the perpendicular position without ever reaching it. In order for the spinner to reach the perpendicular position the elastomer must deform without producing a back pressure on the spinner. One method by which this is accomplished is to have the elastomer flow so that material will be redistributed from areas of high pressure to areas of lower pressure. This type of mechanism is implemented as follows: A spinner is mounted using a material such as an epoxy resin which flows when subject to large pressure and/or high temperature. The mounted spinner is then rotated at a rate which is far above its normal operation range and the temperature increased to a level where the mounting material starts to flow. After the spinner has achieved the optimum running characteristics under these elevated conditions, the temperature and rotation rate are slowly decreased with the result that the mounting material will solidify, locking the spinner in the optimum state.

Figure 5:
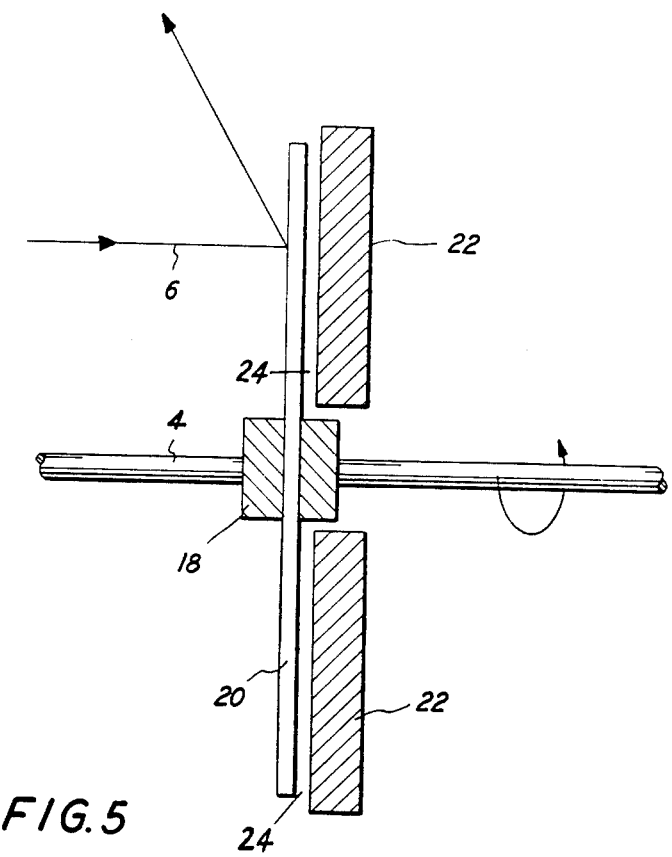
FIG. 5 is a schematic of an alternative embodiment of this invention showing another form of mounting for a holographic spinner.

In an additional embodiment of this invention, as represented in FIG. 5, both the mount and spinner are fabricated with flexible materials, i.e. a so called floppy disk. When a floppy disk is rotated at high rates the disk is straightened out into a flat sheet by centrifugal force. The inherent high stability of such a rotating disk makes it an ideal spinner for a holographic scan system. The flatness and stability of such a disk is increased by running it very close to a stationary flat reference surface. In FIG. 5, a floppy disk 20 is mounted on a resilient mount 18 on a rotor shaft 4. A stationary flat reference surface 22 is mounted adjacent to the disk 20, and parallel to it when the disk is running.

The air in the air gap 24 between the rotating spinner 20 and the stationary surface 22 of FIG. 5 becomes very stiff as a result of kinetic energy transferred to it by the spinner. It is the stiffness of this air which forces the spinner's surface to track the reference surface 22. This stiffness can be increased by decreasing the air gap, by increasing the spinner velocity, or by increasing the air density within the gap. It may be desirable to position the spinner between two reference surfaces with an air gap on each side.

Figure 6:
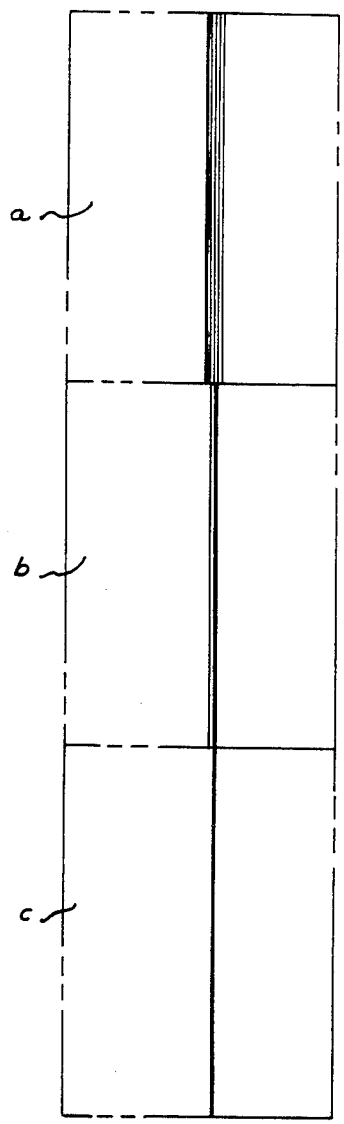
FIG. 6 is a composite photograph comparing results using prior art holographic spinners and holographic spinners according to this invention.

FIG. 6 is a 2× enlarged composite photograph showing the scan line widths generated by the same holographic spinner run at 3000 RPM with three generations of mounting arrangements. Part (a) of this photograph shows the scan line obtained with the spinner rigidly mounted as discussed with reference to FIG. 2 and the prior art; Part (b), the scan line achieved with the spinner run with an initial flexible mounting arrangement; and Part (c) is the scan line obtained with the spinner run with a refined flexible mounting arrangement. Parts (b) and (c) correspond to the FIG. 4 embodiment of this invention. The refined system produces a scan line which is 165 u wide (2.5 spot diameters), as compared with the 1mm wide lines generated by the spinner rigidly mounted.

Holographic scanners utilizing either rigid spinners in flexible mounts as shown in FIG. 4 or floppy disk spinners as shown in FIG. 5 achieve very high levels of performance while still being relatively inexpensive devices to manufacture. The flexible mounting technique disclosed here could also be used to reduce the wobble in a polygonal or multi-faceted mirror scanner.

The foregoing description of an embodiment of this invention is given by way of illustration and not of limitation. The concept and scope of the invention are limited only by the following claims and equivalents thereof which may occur to others skilled in the art.

What is claimed is:

1. A holographic scanning mechanism, including:
   a rotatable shaft,
   a holographic spinner having a holographic facet disposed for rotation with said shaft,
   an elastically deformable member resiliently connecting said holographic spinner, at the hub thereof, to said shaft,
   whereby said spinner, under the influence of centrifugal force, straightens to a condition of substantially uniform perpendicularity relative to its axis of rotation when rotating with said shaft.

2. A light spot scanning mechanism, including:
   a rotatable shaft,
   a hologram having a surface area bearing information for the holographic reconstruction of a spot of light when illuminated by a holographic reconstruction light beam,
   said hologram being disposed for rotation with said shaft and constituting a holographic spinner,
   an elastically deformable member resiliently connecting said holographic spinner, at the hub thereof, to said shaft,
   whereby said spinner, under the influence of centrifugal force, straightens to a substantially perpendicular condition relative to its axis of rotation when rotating with said shaft.

* * * * *